United States Patent
Stolt et al.

(10) Patent No.: US 10,542,277 B2
(45) Date of Patent: Jan. 21, 2020

(54) VIDEO ENCODING

(71) Applicant: ARM Ltd, Cambridge (GB)

(72) Inventors: Fredrik Peter Stolt, Lund (SE); John Nils Andreas Björklund, Lund (SE)

(73) Assignee: Arm Limited, Cambridge (GB)

( * ) Notice: Subject to any disclaimer, the term of this patent is extended or adjusted under 35 U.S.C. 154(b) by 168 days.

(21) Appl. No.: 15/792,231

(22) Filed: Oct. 24, 2017

(65) Prior Publication Data

US 2019/0124347 A1    Apr. 25, 2019

(51) Int. Cl.
| H04N 7/18 | (2006.01) |
| H04N 19/51 | (2014.01) |
| H04N 19/176 | (2014.01) |
| H04N 19/593 | (2014.01) |

(52) U.S. Cl.
CPC .......... *H04N 19/51* (2014.11); *H04N 19/176* (2014.11); *H04N 19/593* (2014.11)

(58) Field of Classification Search
CPC ....................................................... H04N 19/51
USPC ....................................... 375/240.01–240.29
See application file for complete search history.

(56) References Cited

U.S. PATENT DOCUMENTS

| 5,600,375 | A | | 2/1997 | Wickstrom | |
| 5,821,986 | A | * | 10/1998 | Yuan | H04N 7/15 348/14.12 |
| 8,130,277 | B2 | * | 3/2012 | Jayachandra | H04N 5/144 348/208.1 |
| 2003/0206593 | A1 | * | 11/2003 | Srinivasan | H04N 19/70 375/240.16 |
| 2005/0069211 | A1 | * | 3/2005 | Lee | H04N 19/172 382/239 |
| 2006/0008006 | A1 | * | 1/2006 | Cha | H04N 19/176 375/240.16 |
| 2006/0066728 | A1 | * | 3/2006 | Batur | G06T 7/20 348/208.99 |
| 2009/0086816 | A1 | * | 4/2009 | Leontaris | H04N 19/80 375/240.03 |
| 2009/0202163 | A1 | * | 8/2009 | Romm | H04N 19/139 382/236 |
| 2009/0207915 | A1 | * | 8/2009 | Yan | H04N 19/53 375/240.16 |
| 2011/0170608 | A1 | * | 7/2011 | Shi | H04N 19/147 375/240.24 |

(Continued)

*Primary Examiner* — Leron Beck
(74) *Attorney, Agent, or Firm* — EIP US LLP

(57) ABSTRACT

A method of video encoding is provided. The method includes downscaling a block of a frame of a video to generate a downscaled block. The method includes downscaling a reference block of a reference frame of the video to generate a downscaled reference block. The method includes processing the downscaled block to calculate first compression efficacy data indicative of a first efficacy of encoding the block using intra-frame prediction. The method includes processing the downscaled block and the downscaled reference block to calculate second compression efficacy data indicative of a second efficacy of encoding the block using inter-frame prediction. The method includes based on at least one of the first compression efficacy data or the second compression efficacy data, determining that the block is to be encoded using inter-frame prediction. Other methods of video encoding and a video encoder system are also provided.

20 Claims, 4 Drawing Sheets

(56) References Cited

U.S. PATENT DOCUMENTS

| | | | |
|---|---|---|---|
| 2012/0057631 A1* | 3/2012 | Le Leannec | H04N 19/56 375/240.16 |
| 2012/0076203 A1* | 3/2012 | Sugimoto | H04N 19/105 375/240.03 |
| 2012/0201475 A1* | 8/2012 | Carmel | H04N 19/172 382/238 |
| 2013/0022126 A1 | 1/2013 | Xu et al. | |
| 2014/0072240 A1* | 3/2014 | Lee | H04N 19/61 382/250 |
| 2015/0131713 A1* | 5/2015 | Kim | H04N 19/132 375/240.02 |
| 2017/0041606 A1* | 2/2017 | Matsumura | H04N 19/119 |
| 2017/0094311 A1* | 3/2017 | Chou | H04N 19/53 |
| 2018/0295368 A1* | 10/2018 | Shen | H04N 19/154 |

* cited by examiner

VIDEO ENCODING

TECHNICAL FIELD

The present disclosure relates to video processing, and in particular, relates to methods and systems for video encoding.

BACKGROUND

In video encoding, it is known to encode part of a frame using either inter-frame prediction or intra-frame prediction. Inter-frame prediction generally involves encoding the part of the frame relative to a motion translated part of a previously encoded frame. Intra-frame prediction typically involves encoding the part of the frame relative to already encoded and reconstructed pixels adjacent to the left and top borders of the part of the frame.

Video encoding using known methods can require significant power or computing resources.

SUMMARY

According to one aspect, a method of video encoding is provided. The method includes downscaling a block of a frame of a video to generate a downscaled block. The method includes downscaling a reference block of a reference frame of the video to generate a downscaled reference block. The method includes processing the downscaled block to calculate first compression efficacy data indicative of a first efficacy of encoding the block using intra-frame prediction. The method includes processing the downscaled block and the downscaled reference block to calculate second compression efficacy data indicative of a second efficacy of encoding the block using inter-frame prediction. The method includes based on at least one of the first compression efficacy data or the second compression efficacy data, determining that the block is to be encoded using inter-frame prediction.

According to another aspect, a method of video encoding is provided. The method includes downscaling a block of a frame of a video to generate a downscaled block. The method includes processing the downscaled block to generate compression efficacy data indicative of an efficacy of encoding the block using inter-frame prediction. The method includes, based on the compression efficacy data, determining that the block is to be encoded using inter-frame prediction. The method includes encoding the block using inter-frame prediction.

According to yet another aspect, a video encoder system is provided. The video encode system includes storage for storing a frame of a video. The video encode system includes at least one processor communicatively coupled to the storage. The video encode system includes an encoder module. The encoder module is configured to downscale a block of the frame to generate a downscaled block. The encoder module is configured to process the downscaled block to generate compression efficacy data indicative of an efficacy of encoding the block using inter-frame prediction. The encoder module is configured to, based on the compression efficacy data, determine that the block is to be encoded using inter-frame prediction. The encoder module is configured to encode the block using inter-frame prediction.

BRIEF DESCRIPTION OF THE DRAWINGS

Further features will become apparent from the following description, given by way of example only, which is made with reference to the accompanying drawings.

DETAILED DESCRIPTION

Details of systems and methods according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of video encoding including downscaling a block of a frame of a video to generate a downscaled block. The downscaled block is processed to generate compression efficacy data indicative of an efficacy of encoding the block using inter-frame prediction. The efficacy is for example the cost or efficiency of encoding the block using inter-frame prediction, as will be described further below. Based on the compression efficacy data, it is determined that the block is to be encoded using inter-frame prediction, and the block is encoded using inter-frame prediction.

Methods according to these examples therefore allow a decision to be made as to whether to encode the block using inter-frame prediction using a downscaled block. This may have reduced power requirements compared with deciding whether to encode the block using inter-frame prediction using the block prior to downscaling. Furthermore, once it has been decided that the block is to be encoded using inter-frame prediction, various different inter-frame predictions may be investigated and compared against each other before a particular inter-frame prediction is used to encode the block. However, in methods such as this, it is typically unnecessary to also investigate various different intra-frame predictions after it has been determined that the block is to be encoded using inter-frame prediction. Power and computing resources may therefore be saved by avoiding investigation of the different intra-frame predictions. Moreover, it may be possible to investigate a larger number of different inter-frame predictions. This can therefore lead to a more accurate inter-frame prediction being identified, which can allow the block to be encoded more accurately. This may therefore improve the quality of the encoded block.

Figure 1:
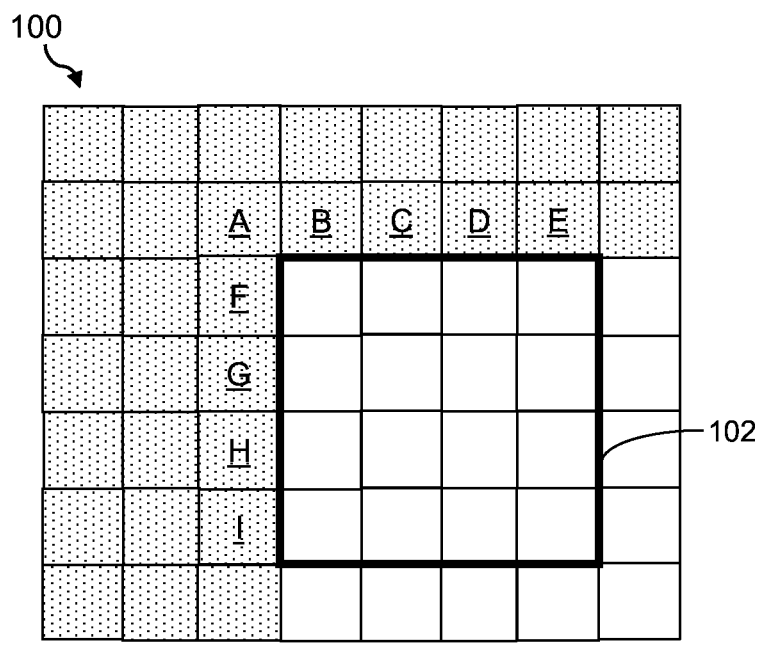
FIG. 1 illustrates schematically an example of intra-frame prediction.
Figure 2A:
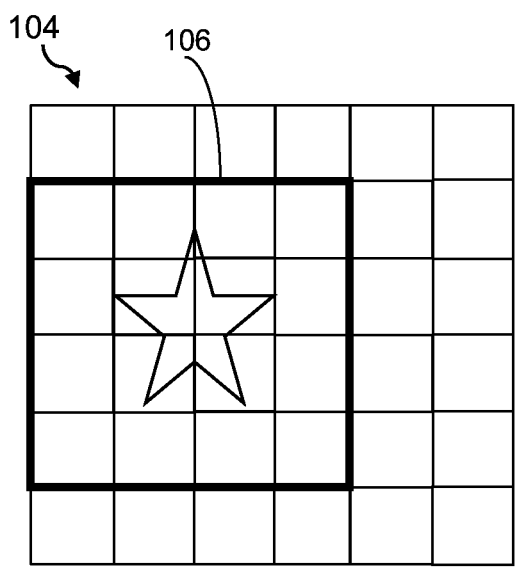
FIGS. 2a and 2b illustrate schematically an example of inter-frame prediction.
Figure 2B:
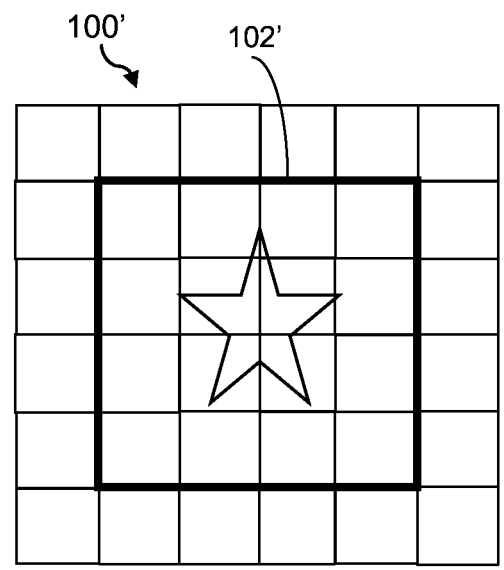

To put these methods into context, a brief description of intra-frame prediction and inter-frame prediction will now be provided with reference to FIGS. 1, and 2a and 2b respectively.

FIG. 1 illustrates schematically an example of intra-frame prediction. FIG. 1 shows part of a frame 100 of a video. A frame for example corresponds to a still image. A series or sequence of frames, which typically represent a series of sequential images, can be considered to correspond to a video or a moving picture. A frame generally includes a plurality of pixels, which may be grouped into blocks for encoding. Encoding of video data typically allows video data to be compressed so that the video data can be represented using fewer bits than an original representation prior to encoding.

An example of a block 102 to be encoded is illustrated schematically in FIG. 1. In FIG. 1 (and for simplicity of illustration), the block is a square 4 by 4 block of neighboring pixels. However, in other examples, a block to be encoded may be a larger square, such as a 32 by 32 or 16 by 16 block of pixels. Alternatively, a block to be encoded may not be square in shape. For example, such a block may be rectangular or may have an irregular shape. Blocks to be encoded are sometimes referred to as macroblocks.

In FIG. 1, the block 102 is encoded relative to already previously encoded and reconstructed pixels adjacent to or neighboring the left and top of the block 102, which may be referred to as an intra-frame prediction. Thus, in FIG. 1, the pixels A to I, which adjoin the left and top sides of the block 102 have already been encoded and reconstructed prior to the encoding of the block 102. The block 102 may be encoded and reconstructed using any suitable video codec, such as the H.264 (MPEG-4 AVC or Advanced Video Coding) or H.265 (MPEG-H Part 2 or High Efficiency Video Coding) video compression standards. Reconstruction of the pixels A to I typically involves decoding the encoded pixels A to I, in other words, reversing the encoding of the pixels A to I. The codec (or the encoding and decoding process) may be lossless or lossy, although typically video compression codecs are lossy.

Encoding of the block 102 using intra-frame prediction may be considered to involve extrapolation of the values of the block 102 from the already encoded and decoded pixels. In other words, generation of an intra-frame predicted block may involve calculating a value of the intra-frame predicted block based on a respective value of at least one other previously encoded and reconstructed pixel of the frame. This therefore exploits spatial correlations between different parts of the same frame, and allows the block 102 to be encoded as a difference between the block 102 and the previously encoded and reconstructed pixels that are used for the intra-frame prediction (in this case, pixels A to I), which may be referred to as delta encoding or delta differencing. This typically allows the block to be encoded with a smaller size, for example allowing the encoded block to be represented by data with a lower number of bits.

The value of the pixels of the block 102 can be predicted in various different ways using the pixels A to I. For example, each of the pixels of the block 102 may be taken to have a value equal to the mean or average of the values of the pixels A to I. Alternatively, each of the pixels in the first, second, third and fourth columns may be taken to have a value equal to the pixels B, C, D and E respectively (a vertical prediction), or each of the pixels in the first, second, third and fourth rows may be taken to have a value equal to the pixels F, G, H and I respectively (a horizontal prediction). Indeed, the precise way in which the values of the pixels A to I are combined to predict the values of the pixels of the block 102 is not particularly limited and various different combinations of some or all of the pixels A to I may be used to predict the value of the block 102 using intra-frame prediction.

In some cases, a plurality of different predictions of the block 102 are calculated from a set of previously encoded and reconstructed pixels (such as the pixels A to I in FIG. 1), and a prediction is selected from the plurality of different predictions. The selected prediction may for example correspond with the prediction that allows the block 102 to be encoded most efficiently of the plurality of different predictions. This will be explained further below.

The value of the block may be an intensity or brightness value, or a color value. For example, where the frame is a color frame, a pixel value of an intensity or brightness for each pixel may be stored separately for each color channel for each different version of the image. If a pixel is represented by, for example, three primary colors such as in the RGB (red, green, blue) or YUV color spaces (where Y represents the luma of the color, U represents the difference between the blue component of the color and the luma and V represents the difference between the red component of the color and the luma), the visual appearance of each pixel may be represented by three intensity values, one for each primary color. As will be appreciated by the skilled person, the values of the pixels of the frame may be represented using any suitable representation, which may be different from the examples set out above, which are merely illustrative.

Although in the example of FIG. 1, the block 102 is encoded based on the previously encoded and reconstructed pixels of one row of pixels neighboring the top of the block 102 and one column of pixels neighboring the left of the block 102, in other examples the block 102 may be encoded relative to other previously encoded and reconstructed pixels of the frame. For example, the block 102 may be encoded relative to a plurality of rows and/or columns, which may be adjacent to or neighboring any side of the block 102 or which may be separated from the block 102 by one or more intervening pixels or rows or columns of pixels.

FIGS. 2a and 2b illustrate an alternative way in which video data may be encoded. FIGS. 2a and 2b show schematically an example of an inter-frame prediction, in which a block 102' of a frame 100' is encoded relative to a reference block 104 of a reference frame 106, which is for example a previously encoded frame. The reference frame 106 may be immediately previous to the frame 100' to be encoded, without intervening frames, or there may be one or more frames between the reference frame 106 and the frame 100' to be encoded.

Inter-frame prediction may be considered to exploit temporal redundancy or correlations between frames. As video data generally includes a sequence of frames that represent a temporal sequence of images, motion or movement of images between frames will typically also be sequential. For example, a video of a person walking in front of a blank background may correspond with a series of frames in which the person's position gradually changes as the person sequentially lifts their legs up and down and moves across the background. By using inter-frame prediction, motion of a block of pixels from a reference frame to a subsequent frame can be determined and the block can be encoded by motion data representative of motion or movement of a matching reference block in the reference frame to the position of the block in the frame to be encoded. In some cases, the reference block may not be an exact match to the block to be encoded, for example if there is an illumination or brightness change between the reference block and the block to be encoded. In such cases, a difference or residual between the reference block and the block can also be calculated, stored and subsequently used during decoding to recover the block.

As will be appreciated, videos may also include blocks which do not change between the reference frame and the frame (for example blocks of a background of an image). Inter-frame prediction allows such blocks to be encoded efficiently as data indicative that these blocks are a direct copy of the corresponding reference blocks.

FIG. 2a illustrates the reference frame 104, which includes the reference block 106. The reference block 106 includes an image of a star. This image is included for illustration purposes, to allow the motion between the reference block 106 and the block 102' to be encoded to be seen more clearly. FIG. 2b illustrates the block 102' to be encoded in the frame to be encoded 100'.

As can be seen from a comparison between FIGS. 2a and 2b, the reference block 106 corresponds to the block 102'. However, the block 102' is shifted or moved to the right in the frame 100' compared with the position of the reference block 106 in the reference frame 104. Generating an inter-frame predicted block such as the block 102' of FIG. 2b may therefore involve transforming the reference block 106 using motion data representative of an estimated motion between the block 102' and the reference block 106. The motion data is for example representative of a motion vector corresponding to an estimated motion from the reference block 106 to the block 102'. In FIGS. 2a and 2b, the motion vector represents movement of the reference block 106 to the right to move from the position of the reference block 106 in the reference frame 104 to the position of the block 102' in the frame 100'.

The motion represented by the motion data may be considered to be an estimated motion because, as explained above, it may not be possible to find a direct or exact match between a reference block of the reference frame and the block to be encoded of the frame. Moreover, video data often represents a three-dimensional scene. However, in such cases, frames of a video are a projection of the three-dimensional scene into two dimensions. It may therefore not possible to fully determine the movement between frames, if such movement is in three dimensions rather than two dimensions.

Nevertheless, there exist a number of methods by which motion of a video sequence can be estimated. For example, a block-matching algorithm may be used to identify a match between the reference block 106 and the block 102'. Typical block-matching algorithms involve comparing the block 102' to be encoded with a corresponding block of the reference frame as well as one or more blocks adjacent to or neighboring the corresponding block of the reference frame. A cost function between the block 102' and these blocks of the reference frame may be calculated, for example by calculating a mean absolute difference or mean squared error, to determine the reference block 106 that most closely matches the block 102'. The motion vector in such cases may therefore be taken as the motion vector representative of the motion or movement from the reference block 106 (which most closely matches the block 102') to the block 102'.

A block-matching algorithm is an example of a direct method of motion estimation, in which motion is estimated based on a comparison between pixel values in a reference frame and a frame to be encoded (and other direct methods are possible). Indirect methods, which aim to match features between frames rather than pixel values, may also be used for inter-frame predictions instead of direct methods.

Figure 3:
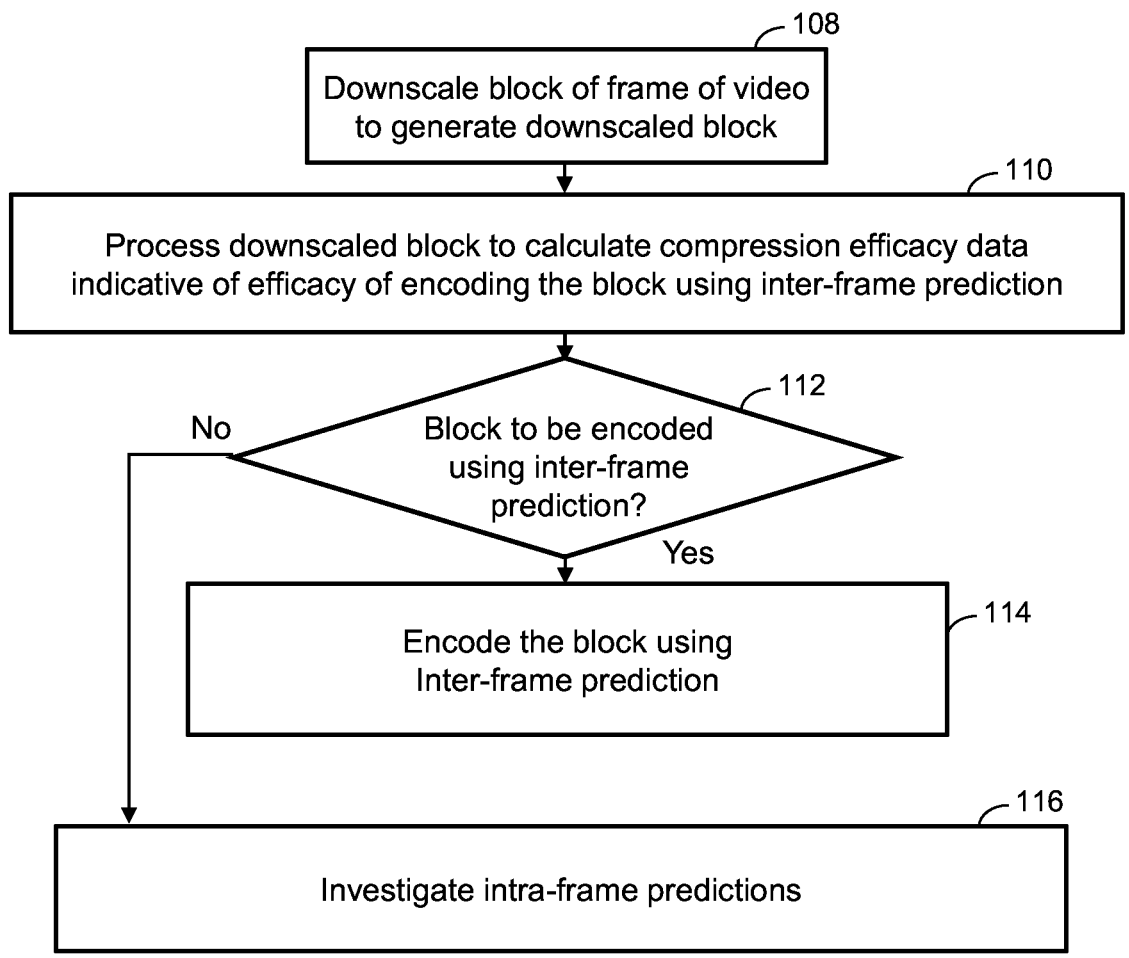
FIG. 3 is a flow diagram illustrating a method of video encoding according to examples.

FIG. 3 is a flow diagram illustrating a method of video encoding according to examples. At 108, a block of a frame of a video is downscaled to generate a downscaled block. The downscaling may involve resize the block to a smaller size, which may be referred to as downsampling or minification. Any suitable downscaling method may be used. For example, the downscaling may involve reducing the pixel size by a factor, such as a factor of 2 or 4. In these cases, the width and height of the downscaled black may be 1/F times the width and height (respectively) of the block prior to downscaling (where F is the downscaling factor). The block before downscaling may be relatively large, for example 32 pixels by 32 pixels or 16 pixels by 16 pixels so that the downscaled block is sufficiently large that, even if after downscaling, it includes detail or features of the block prior to downscaling. Other block sizes and shapes are, however, possible (as noted above).

Downscaling of the block of the frame of the video may involve downscaling the frame of the video to generate a downscaled frame and subsequently dividing the downscaled frame into downscaled blocks. Alternatively, the frame may be divided into blocks prior to downscaling and each block may be downscaled separately.

At 110 of FIG. 3, the downscaled block is processed to generate compression efficacy data indicative of an efficacy of encoding the block using inter-frame prediction, for example relative to a reference block of a reference frame of the video. The compression efficacy data may correspond with an efficacy, efficiency or cost of encoding the block using inter-frame prediction. The compression efficacy data may represent any suitable metric or measure that provides an indication of the efficacy of encoding the block using inter-frame prediction. Such an indication may be used, in turn, to determine whether the block should indeed be encoded using inter-frame prediction. There are thus various different ways in which the compression efficacy data may be calculated, as will be explained further below.

At 112 of FIG. 3, it is determined, based on the compression efficacy data, that the block is to be encoded using inter-frame prediction and at 114 the block is encoded using inter-frame prediction. The compression efficacy data may therefore be used to determine whether inter-frame prediction is suitable for encoding of the block. If it is, the method in these examples proceeds to encode the block relative to the reference block, for example using inter-frame prediction, at 114.

If, at 112, it is not determined that the block is to be encoded using inter-frame prediction, various intra-frame predictions are investigated at 116. One of these intra-frame predictions may then be selected for encoding the block and the block may then be encoded using intra-frame prediction. In some cases, 116 may involve investigating block intra-frame predictions and inter-frame predictions. The block may then be encoded using either intra-frame prediction or inter-frame prediction depending on which of these predictions is determined to be most efficient or accurate. In other words, a negative determination at 112 does not necessarily mean that the block won't be encoded using inter-frame prediction. Rather, such a negative determination instead means that it cannot be guaranteed that the block will be encoded using inter-frame prediction and that it may be encoded by methods other than inter-frame prediction (or it may indeed be encoded by inter-frame prediction, for example depending on further processing such as a further investigation of various inter-frame predictions based on the full precision block rather than the downscaled block).

Methods such as FIG. 3 may therefore allow a decision to be taken as to whether intra-frame predictions are to be investigated or whether it is unnecessary to investigate intra-frame predictions. By performing this determination based on the analysis or processing of downscaled data, the method may be more efficient than processing of the data prior to downscaling (which may be full precision data). In other words, methods such as these may be considered to correspond to a rough or coarse estimation of whether intra-frame predictions are likely to be necessary. Intra-frame predictions are typically worse, for example less accurate or less efficient to encode, than inter-frame predictions. However, intra-frame predictions can be useful in cases in which there is rapid or unpredictable movement between frames (such as movement of running water), which is less amenable to inter-frame prediction, or in which an object appears for the first time in a particular frame, or in which the frame to be encoded is the first in a series of frames. In the methods described herein, by taking a decision not to investigate intra-frame predictions before processing of the block and/or the reference block at full precision, power and computational resources may be saved. For example, it may be decided not to investigate intra-frame predictions where the compression efficacy data indicates that it is unlikely that an intra-frame prediction will be chosen to encode the block. Furthermore, the saved computational resources may be used to investigate further inter-frame prediction alternatives, which may allow a more accurate inter-frame prediction to be identified. This may therefore improve the quality of the encoded block.

Various methods of calculating compression efficacy data will now be described. Methods in accordance with FIG. 3 may include downscaling the reference block to generate a downscaled reference block. The reference block may be downscaled similarly to the downscaling of the block or using a different method. In such cases, the processing of the downscaled block at 110 may involve generating, using inter-frame prediction, an inter-frame predicted downscaled block based on the downscaled block and the downscaled reference block. The inter-frame predicted downscaled block may be calculated as described above with reference to FIGS. 2a and 2b. For example, the inter-frame predicted downscaled block may be generated by estimating motion data representative of a motion from the downscaled reference block to the downscaled block, and then transforming the downscaled reference block using the motion data to generate the inter-frame predicted downscaled block.

In examples such as this, the compression efficacy data may be representative of an inter-frame prediction comparison between the inter-frame predicted downscaled block and the downscaled block. The inter-frame prediction comparison may indicate how similar the inter-frame predicted downscaled block and the downscaled block are, and therefore the accuracy of the inter-frame prediction or the likely cost, efficiency or efficacy of encoding the block using inter-frame prediction. If it is determined that the inter-frame prediction is sufficiently efficacious, it may be determined that the block is to be encoded relative to the reference block (for example using inter-frame prediction), without investigating intra-frame predictions.

In these examples, the inter-frame prediction comparison may be representative of an inter-frame prediction difference between the inter-frame predicted downscaled block, IE, and the downscaled block, D. This may be calculated as a sum of absolute differences of the inter-frame prediction, $SAD_{inter}$:

$$SAD_{inter} = \sum_j \sum_i |IE_{ij} - D_{ij}|$$

where (i, j) represents a pixel coordinate. In other examples, though, the inter-frame prediction difference may be calculated differently; $SAD_{inter}$ is merely one example of a suitable expression for calculation of the inter-frame prediction difference.

Determining that the block is to be encoded relative to the reference block may include determining that the inter-frame prediction difference, which may for example be calculated as $SAD_{inter}$, is equal to or smaller than a threshold inter-frame prediction difference. In such cases, the inter-frame predicted downscaled block is relatively similar to the downscaled block, suggesting that the downscaled block can be encoded relatively accurately using inter-frame prediction. In such cases, it may thus not be necessary to investigate intra-frame predictions for encoding of the block. The threshold inter-frame prediction difference may be determined empirically, for example based on a desired quality of the block or an acceptable extent of losses, which may for example be characterized by a quantization parameter. Generally, a greater amount of quantization results in a greater loss of information during encoding and therefore a lower quality block after decoding. However, greater quantization may also reduce the amount of data required to encode the block. There is thus typically a trade-off between quality and amount of data. A higher quantization parameter may correspond with a larger threshold inter-frame prediction difference, which may lead to a lower quality block after decoding (for blocks with $SAD_{inter}$ equal to or smaller than a threshold inter-frame prediction difference). Conversely, a lower quantization parameter may correspond with a smaller threshold inter-frame prediction difference, which may lead to a higher quality block after decoding (for blocks with $SAD_{inter}$ equal to or smaller than a threshold inter-frame prediction difference), due to reduced data loss during encoding and decoding.

One or more inter-frame predicted downscaled block may be calculated, using solely one motion vector or a plurality of motion vectors (which may be represented by the motion data). The motion vector typically represents motion between the reference frame and a frame to be encoded. The reference frame may be previous to or ahead of the frame to be encoded in a stream of frames. For example, the reference frame may be immediately previous to or ahead of the frame to be encoded or there may be one or more intervening frames between the reference frame and the frame to be encoded. In cases in which the motion data represents a plurality of motion vectors, some or all of the motion vectors may represent motion or predicted motion between various different reference frames and the frame to be encoded. For example, a plurality of different inter-frame predicted downscaled blocks may be calculated based on different motion vectors representative of motion between different reference frames and the frame to be encoded. The plurality of different inter-frame predicted downscaled blocks may then be merged, for example by averaging the pixel values for the different inter-frame predicted downscaled blocks, to generate the inter-frame predicted downscaled block referred to herein. In other examples, though, a plurality of different inter-frame predicted downscaled blocks may be generated and the inter-frame prediction comparison may be taken to be the smallest inter-frame prediction comparison between downscaled block and the inter-frame predicted downscaled block, such as the inter-frame predicted downscaled block with the smallest $SAD_{inter}$.

As another example, the processing of the downscaled block may include processing the downscaled block with the downscaled reference block to calculate motion data representative of an estimated motion between the downscaled block and the downscaled reference block, for example as explained above with reference to FIGS. 2a and 2b. In these examples, the compression efficacy data is representative of a motion comparison between the estimated motion and a predicted motion. The predicted motion may for example be between a further downscaled block of the frame and a corresponding further downscaled reference block of the reference frame. For example, the predicted motion may be an estimated motion of a different downscaled block of the frame. The different downscaled block may be a neighboring or adjacent downscaled block to the downscaled block to be encoded or separated from the downscaled block to be encoded by one or more intervening downscaled blocks. In other examples, the predicted motion may correspond with a global estimated motion of the downscaled frame as a whole relative to the downscaled reference frame, or to an estimated motion of a portion of the downscaled frame compared with a corresponding portion of the downscaled reference frame. In yet further examples, the predicted motion may be calculated using a further block of the frame and a further reference block of the reference frame. In other words, the full precision or full resolution frame and reference frame (or further block and further reference block) rather than the downscaled versions. As described above for calculation of the predicted motion using the further downscaled block, the further block may be a neighboring or adjacent block to the block to be encoded, or separated from the block by one or more intervening blocks. Furthermore, the predicted motion may correspond with a global estimated motion or a local estimated motion of the frame relative to the reference frame.

In these examples, determining that the block is to be encoded relative to the reference block may include determining that the motion data or the motion comparison are less than or equal to a threshold motion. For example, in a scene with unpredictable motion, such as a scene of running water, the estimated motion may be a random vector rather than being similar to other motion vectors representative of motion of other blocks of the frame. In such examples, the motion comparison or the motion data may be higher than the threshold motion. Thus, a new or different motion vector may be an indication that inter-frame prediction is not suitable for a particular block. It may therefore be desirable to encode the block using intra-frame prediction rather than inter-frame prediction. Conversely, a relatively static scene may be particularly suitable for encoding with inter-frame prediction, as such scenes may be encoded efficiently, due to relatively small differences between the reference frame and the frame to be encoded. As described above for a comparison between $SAD_{inter}$ and a threshold inter-frame prediction difference, the threshold motion may be determined empirically depending on a desired quality of the block after encoding and decoding or an available amount of data for encoding the block. Furthermore, as explained above, the estimated motion may be calculated between the downscaled block and solely one downscaled reference block or between the downscaled block and each of a plurality of downscaled reference blocks, each with a different estimated motion compared with the downscaled block. If a plurality of downscaled reference blocks are calculated, the motion comparison used for the compression efficacy data may be the minimum motion comparison, for example the minimum difference between the estimated motion and the predicted motion.

Figure 4:
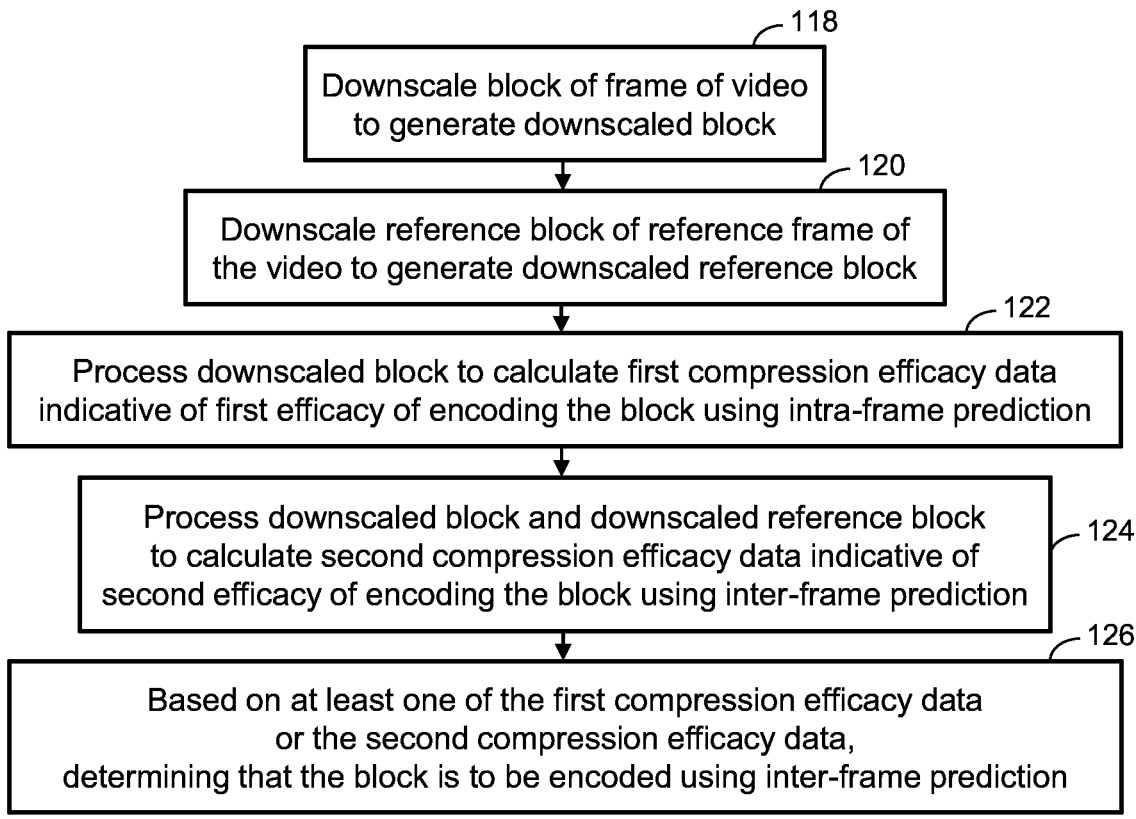
FIG. 4 is a flow diagram illustrating a method of video encoding according to further examples.

FIG. 4 is a flow diagram illustrating a method of video encoding according to further examples. FIG. 4 also illustrates a further example of compression efficacy data. At 118 of FIG. 4, a block of a frame of a video is downscaled to generate a downscaled block. At 120, a reference block of a reference frame of the video is downscaled to generate a downscaled reference block. At 122 of FIG. 4, the downscaled block is processed to calculate first compression efficacy data indicative of a first efficacy of encoding the block using intra-frame prediction. At 124 of FIG. 4, the downscaled block is processed to calculate second compression efficacy data indicative of a second efficacy of encoding the block using inter-frame prediction. At 126, based on at least one of the first compression efficacy data or the second compression efficacy data, it is determined that the block is to be encoded using inter-frame prediction. Although not shown in FIG. 4, it is to be appreciated that 126 may be similar to 112 of FIG. 3. Thus, if it is determined that the block is to be encoded using inter-frame prediction at 126, the block may subsequently be encoded using inter-frame prediction. If otherwise, one or more intra-frame predictions, alone or in combination with one or more inter-frame predictions, may be investigated, similarly to 116 of FIG. 3.

The first compression efficacy data and the second compression efficacy data may be similar to the compression efficacy data described above, but related to the efficacy, efficiency or cost of encoding the block using intra-frame prediction and inter-frame prediction respectively. For example, the first compression efficacy data may be representative of a first difference between an intra-frame predicted downscaled block and the downscaled block and the second compression efficacy data may be representative of a second difference between an inter-frame prediction downscaled block and the downscaled block. The first compression efficacy data may be taken as the sum of absolute differences for intra-prediction ($SAD_{intra}$):

$$SAD_{intra} = \sum_j \sum_i |IA_{ij} - D_{ij}|$$

where IA is the intra-frame predicted downscaled block, D is the downscaled block, and (i, j) represents a pixel coordinate.

The second compression efficacy data may be taken as the sum of absolute differences for inter-prediction ($SAD_{inter}$), as described above, although other expressions may alternatively be used to calculate the first compression efficacy data and the second compression efficacy data.

In methods such as FIG. 4, it may be determined whether to encode the block using inter-frame prediction using one or both of the first compression efficacy data or the second compression efficacy data. For example, it may be determined whether the second compression efficacy data is equal to or less than a threshold for inter-frame prediction. This may be used alone or in conjunction with the first compression efficacy data to assess whether the block is to be encoded using inter-frame prediction. For example, if in addition the first compression efficacy data is above a threshold (indicating that the intra-frame prediction is relatively inefficient), the block may be encoded using inter-frame prediction without calculating further intra-frame predictions. Conversely, if the first compression efficacy data is equal to or less than a threshold, further intra-frame predictions may be investigated, for example using the block without downscaling. Such a threshold may be determined empirically, as described above for various other thresholds.

In other examples, the first compression efficacy data and the second compression efficacy data may be used to calculate or generate the compression efficacy data or the compression efficacy may represent a relative difference between the first compression efficacy data and the second compression efficacy data. For example, the compression efficacy data may be based on a comparison calculated using the intra-frame predicted downscaled block and the inter-frame predicted downscaled block. Such a comparison may for example be calculated by comparing the first difference between the intra-frame predicted downscaled block and the downscaled block (such as $SAD_{intra}$) and the second difference between the inter-frame predicted downscaled block and the downscaled block (such as $SAD_{inter}$). In examples such as this, determining that the block is to be encoded using inter-frame prediction may include determining that a ratio of the second difference to the first difference is equal to or smaller than a threshold ratio. For example, where $SAD_{inter}$ is much smaller than $SAD_{intra}$ it may be determined that the block may be encoded using inter-frame prediction. Similarly to other thresholds referred to herein, the threshold ratio may be determined empirically. In examples, the block may be encoded using inter-frame prediction in cases where $SAD_{inter}$ is equal to or less than half of $SAD_{intra}$, although other threshold ratios may be used in other examples.

Calculation of the first compression efficacy data may involve the investigation of one or a plurality of different intra-frame predictions. Similarly, the calculation of the second compression efficacy data may involve the investigation of one or a plurality of different inter-frame predictions. Where a plurality of different intra-frame or inter-frame predictions are used to calculate the first or second compression efficacy data, respectively, the intra-frame or inter-frame prediction that minimizes the first or second compression efficacy data may be selected as the intra-frame or inter-frame prediction that corresponds to the first or second compression efficacy data. In other examples, though, the plurality of different intra-frame or inter-frame predictions may be used in a different way (for example averaged) to generate the first or second compression efficacy data, respectively.

Figure 5:
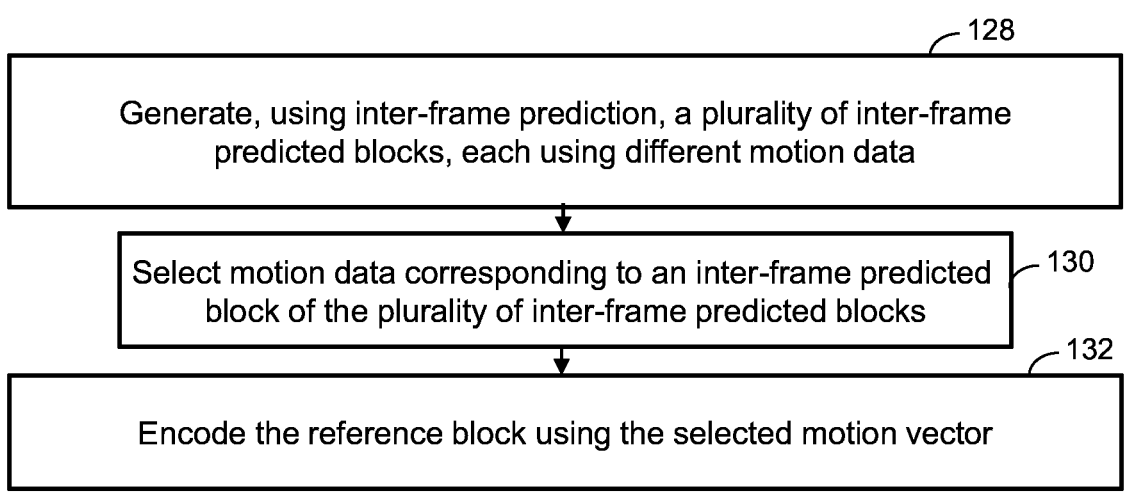
FIG. 5 is a flow diagram illustrating a method of video encoding according to yet further examples.

In examples such as FIG. 4, after determining that the block is to be encoded using inter-frame prediction, the block may be encoded using inter-frame prediction without generating an intra-frame predicted block based on the block. FIG. 5 shows such in example.

In 128 of FIG. 5, which is for example after determining that the block is to be encoded using inter-frame prediction such as after 126 of FIG. 4 or after 114 of FIG. 3, and without using intra-frame prediction, a plurality of inter-frame predicted blocks may be generated, each using different motion data representative of different estimated motion between the inter-frame predicted block and a reference block of the reference block. For example, the block may be matched with various different reference blocks of the reference frame and motion vectors calculated to represent motion from each of these reference blocks to the block. Each of the different reference blocks may then be transformed with a corresponding motion vector to obtain a corresponding inter-frame predicted block.

Subsequently, at 130 of FIG. 5, motion data corresponding to an inter-frame predicted block of the plurality of inter-frame predicted blocks may be selected. The motion data may be selected by identifying the inter-frame predicted block that is most similar to the block, for example by calculating a sum of absolute differences between the pixel values of the block and the corresponding pixel values of the inter-frame predicted block, for each of the plurality of inter-frame predicted blocks. For example, the selected motion data may correspond to the inter-frame predicted block with the smallest sum of absolute differences between the pixel values of the block and the corresponding pixel values of the inter-frame predicted block (although other ways of selecting the motion data are possible in other examples).

The block may then be encoded relative to the reference block using the selected motion data, at block 132 of FIG. 5. For example, the selected motion data may represent a motion vector that points to the position of the reference block in the reference frame, which may be used to encode the block. As explained above, an error or residual between the block and the reference block may also be encoded, which may be used by the decoder to more accurately reconstruct the pixels of the block.

In examples such as FIG. 5, the generating, selecting and encoding of 128, 130, 132 of FIG. 5 may be performed without using intra-frame prediction. As explained above, this may reduce power consumption compared to cases in which intra-frame predictions are investigation using the block without downscaling.

FIG. 5 is an example of a rate-distortion decision mechanism (sometimes referred to as rate-distortion optimization), in which the amount of distortion or loss of video quality is optimized against the amount of data for encoding the frame. In the example of FIG. 5, the rate-distortion decision mechanism therefore involves an optimization process based on inter-frame predictions, which does not include intra-frame predictions. For example, where it is determined that the block is to be encoded using inter-frame prediction, the rate-distortion decision mechanism may be considered to involve determining an appropriate inter-frame prediction for encoding the block, which optimizes the quality of the block against the quantity of data for encoding the block.

Figure 6:
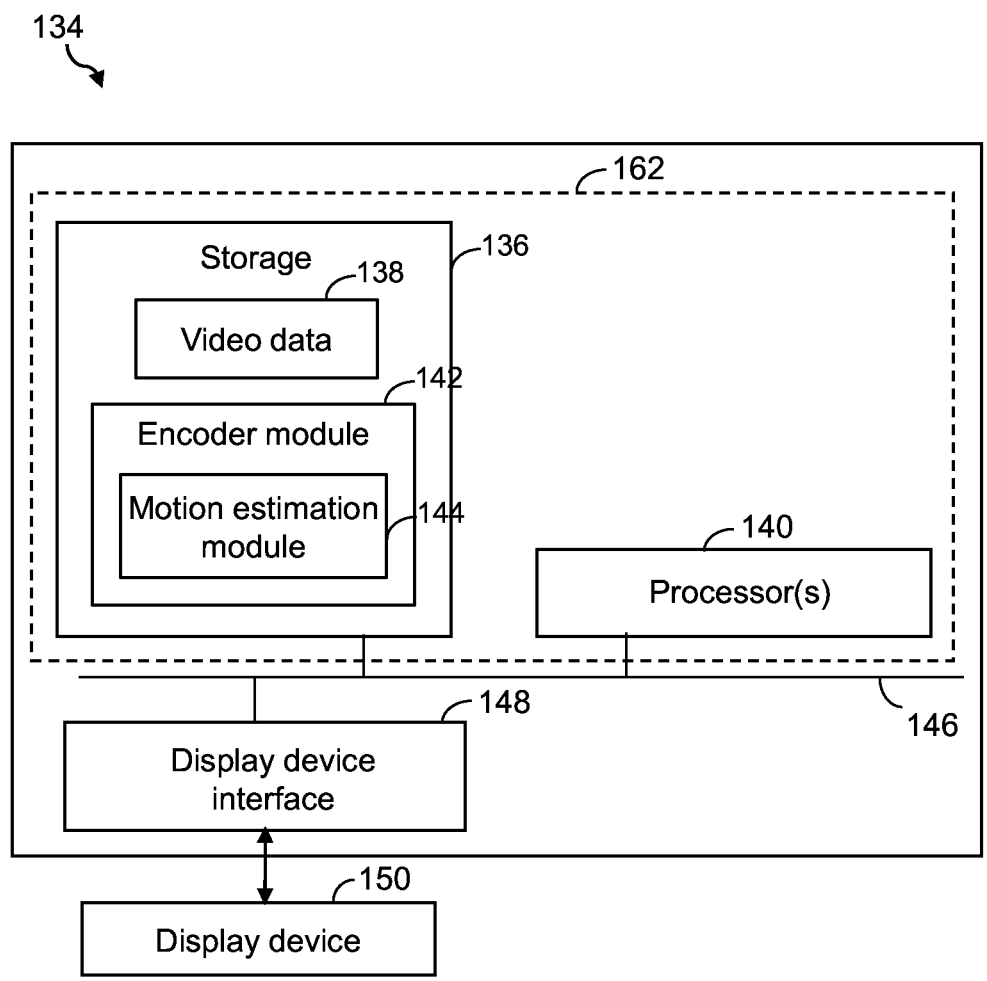
FIG. 6 illustrates schematically internal components of an example computer device including a video encoding system according to examples.

FIG. 6 illustrates schematically an example of internal components of a computing device 134 for use with the methods described herein.

The computing device 134 may be or include, amongst others, a cell phone, i.e. a mobile phone, for example a smartphone, a tablet, laptop or personal computer, a personal digital assistant, as well as various other electronic devices such as a game console. The computing device 134 of FIG. 6 may include a network interface (not illustrated) to receive video data from a server device, such as a server device hosting video content. The network interface of the computing device 134 may include software and/or hardware components, such as a virtual network interface, an Ethernet port, a software driver and/or communications stack interacting with network hardware.

Storage 136 of the computing device 134 in the example of FIG. 6 stores video data 138. In this example, the video data 138 includes a frame of a video, which for example includes a block of pixels as described above. The video data 138 may have been received via the network interface, from external components coupled to or in communication with the computing device 134 or from other internal components of the computing device 134.

The storage 136 may include at least one of volatile memory, such as a Random Access Memory (RAM) and non-volatile memory, such as Read Only Memory (ROM) or a solid state drive (SSD) such as Flash memory. The storage 136 in examples may include further storage devices, for example magnetic, optical or tape media, compact disc (CD), digital versatile disc (DVD) or other data storage media. The storage 136 may be removable or non-removable from the computing device 134.

At least one processor 140 is communicatively coupled to the storage 136 in the computing device 134 of FIG. 6. The at least one processor 140 in the example of FIG. 6 may include a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The at least one processor 140 may also be or include at least one graphics processing unit (GPU) such as an NVIDIA® GeForce® GTX 980, available from NVIDIA®, 2701 San Tomas Expressway, Santa Clara, Calif. 95050, USA, although other processors are possible. For example, in one case the computing device may comprise a thin terminal with graphics processing capabilities; in other cases the computing device may comprise a computing device comprising at least one central processing unit (CPU) and at least one graphics processing unit.

The storage 136 in the example of FIG. 6 includes computer program instructions configured to, when processed by the at least one processor 140, implement an encoder module 142. The encoder module 142 may perform the methods described herein, such as the methods described above with reference to FIGS. 3 to 5. The computer program instructions may be stored in an accessible non-transitory computer-readable medium and loaded into memory, for example the storage 136, to implement the encoder module 142.

In the example of FIG. 6, the encoder module 142 includes a motion estimation module 144. The motion estimation module 144 may for example be configured to downscale the block of the frame, process the downscaled block to generate the compression efficacy data and, based on the compression efficacy data, determine that the block is to be encoded using inter-frame prediction. The motion estimation module 144 may be further configured to downscale a reference block of a reference frame of the video to generate a downscaled reference block (for example by downscaling the reference frame of the video and subsequently dividing the downscaled reference frame into downscaled reference blocks). The motion estimation module 144 may additionally be configured to process the downscaled block with the downscaled reference block to calculate motion data representative of an estimated motion between the downscaled block and the downscaled reference block. In this way, the motion estimation module 144 may be used to perform coarse or rough motion estimation between the frame and the reference frame, to perform a rough estimate of the motion between the frame and the reference frame. For example, the motion estimation module 144 may be configured to perform a pre-processing rough motion estimation based on the downscaled frame and the downscaled reference frame. Using the rough motion estimation, long motion vectors indicative of motion between the downscaled reference frame and the downscaled frame may be identified. These long motion vectors may be used subsequently by a more precise motion estimation process, for example as a starting point for identifying fine-grained or higher precision motion vectors representative of motion from a reference block of the reference frame to the block to be encoded of a current frame. In these cases, the motion estimation module 144 may be used to perform the rough motion estimation process as well as determining, using the downscaled frame and/or the downscaled reference frame, whether the block is to be encoded using inter-frame prediction, or whether intra-frame predictions are to be investigated, alone or in addition to further inter-frame predictions based on the block. In this way, the downscaled frame and/or the downscaled reference frame can be used for two purposes: rough motion estimation and inter-frame prediction determination. The determination of whether the block is to be encoded using inter-frame prediction can therefore be made without generating a large amount of extra data and without introducing significant complexity to the encoding process.

The storage 136 may also include computer program instructions which, when processed by the at least processor 140, implement a decoder module (not illustrated) for decoding video data encoded using the methods described herein.

The components of the computing device 134 in the example of FIG. 6 are interconnected using a systems bus 146. This allows data to be transferred between the various components. For example, a frame encoded using the methods described herein can be stored in the storage 136 and subsequently transmitted via the systems bus 146 from the storage 136 to other components, such as a further computing device coupled to or in communication with the computing device 134. Alternative, an encoded frame may be decoded by the decoder module and transferred from the storage 136, via the systems bus 146, to a display device interface 148 for transfer to a display device 150 for display. The display device interface 148 may include a display port and/or an internal electronics interface, e.g. where the display device 150 is part of the computing device 134 such as a display screen of a smartphone. Therefore, when instructed by the at least one processor 140 via the display device interface 148, the display device 150 will display the video including the decoded frame.

The above examples are to be understood as illustrative examples. Further examples are envisaged. The examples described herein relate to determining that the block is to be encoded using inter-frame prediction. However, examples similar to those involve may involve processing the downscaled block to generate intra-frame prediction compression efficacy data indicative of an efficacy of encoding the block using intra-frame prediction; based on the intra-frame prediction compression efficacy data, determining that the block is to be encoded using intra-frame prediction; and encoding the block using intra-frame prediction. For example, the intra-frame prediction compression efficacy may be an inverse of the compression efficacy data described above. For example, it may be determined that the block is to be encoded using intra-frame prediction where the motion data is above a motion threshold (in other words that the motion of the frame relative to the reference frame is significant) or where the difference between an inter-frame predicted block and the block is above a threshold difference, indicating that it is relatively inefficient to encode the block using inter-frame prediction.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of video encoding comprising:
   downscaling a block of a frame of a video to generate a downscaled block;
   processing the downscaled block to generate compression efficacy data indicative of an efficacy of encoding the block using inter-frame prediction;
   based on the compression efficacy data, determining that the block is to be encoded using inter-frame prediction;
   encoding the block using inter-frame prediction; and
   downscaling a reference block of a reference frame of the video to generate a downscaled reference block, wherein:
   the processing the downscaled block comprises processing the downscaled block with the downscaled reference block to calculate motion data representative of an estimated motion between the downscaled block and the downscaled reference block; and the compression efficacy data is representative of a motion comparison between the estimated motion and a predicted motion.

2. The method according to claim 1, comprising, after the determining that the block is to be encoded using inter-frame prediction, encoding the block using inter-frame prediction without generating an intra-frame predicted block based on the block.

3. The method according to claim 1, comprising, after the determining that the block is to be encoded using inter-frame prediction:
   generating, using inter-frame prediction, a plurality of inter-frame predicted blocks, each using different motion data representative of different estimated motion between the inter-frame predicted block and a reference block of the reference frame;
   selecting motion data corresponding to an inter-frame predicted block of the plurality of inter-frame predicted blocks; and
   encoding the block relative to the reference block using the selected motion data.

4. The method according to claim 1 wherein the predicted motion is between a further downscaled block of the frame and a corresponding further downscaled reference block of the reference frame.

5. A method of video encoding comprising:
   downscaling a block of a frame of a video to generate a downscaled block;
   processing the downscaled block to generate compression efficacy data indicative of an efficacy of encoding the block using inter-frame prediction;
   based on the compression efficacy data, determining that the block is to be encoded using inter-frame prediction;
   encoding the block using inter-frame prediction;
   downscaling a reference block of a reference frame of the video to generate a downscaled reference block, wherein:
   the processing the downscaled block comprises:
      generating, using inter-frame prediction, an inter-frame predicted downscaled block based on the downscaled block and the downscaled reference block; and
   the compression efficacy data is representative of an inter-frame prediction comparison between the inter-frame predicted downscaled block and the downscaled block;
   the inter-frame prediction comparison is representative of an inter-frame prediction difference between the inter-frame predicted downscaled block and the downscaled block; and
   the determining that the block is to be encoded relative to the reference block comprises determining that the inter-frame prediction difference is equal to or smaller than a threshold inter-frame prediction difference.

6. The method according to claim 5, wherein:
   the processing the downscaled block comprises:
      generating, using intra-frame prediction, an intra-frame predicted downscaled block based on the downscaled block; and
      wherein the compression efficacy data is based on a comparison calculated using the intra-frame predicted downscaled block and the inter-frame predicted downscaled block.

7. The method according to claim 6, comprising calculating the comparison by comparing:
   a first difference between the intra-frame predicted downscaled block and the downscaled block; and
   a second difference between the inter-frame predicted downscaled block and the downscaled block.

8. The method according to claim 7, wherein the determining that the block is to be encoded using inter-frame prediction comprises determining that a ratio of the second difference to the first difference is equal to or smaller than a threshold ratio.

9. The method according to claim 6, wherein the generating the intra-frame predicted downscaled block comprises calculating a value of the intra-frame predicted downscaled block based on a respective value of at least one other previously encoded and reconstructed downscaled pixel of the frame.

10. The method according to claim 6, wherein the generating the inter-frame predicted downscaled block comprises transforming the reference block using motion data representative of an estimated motion between the downscaled block and the reference block.

11. The method according to claim 5,
    comprising, after the determining that the block is to be encoded using inter-frame prediction, encoding the block using inter-frame prediction without generating an intra-frame predicted block based on the block.

12. The method according to claim 5, wherein:
    the processing the downscaled block comprises processing the downscaled block with the downscaled reference block to calculate motion data representative of an estimated motion between the downscaled block and the downscaled reference block; and
    the compression efficacy data is representative of a motion comparison between the estimated motion and a predicted motion.

13. The method according to claim 12, wherein the predicted motion is between a further downscaled block of the frame and a corresponding further downscaled reference block of the reference frame.

14. The method according to claim 5, comprising, after the determining that the block is to be encoded using inter-frame prediction:
    generating, using inter-frame prediction, a plurality of inter-frame predicted blocks, each using different motion data representative of different estimated motion between the inter-frame predicted block and a reference block of the reference frame;

selecting motion data corresponding to an inter-frame predicted block of the plurality of inter-frame predicted blocks; and encoding the block relative to the reference block using the selected motion data.

15. The method according to claim 14, comprising performing the generating, the selecting and the encoding without using intra-frame prediction.

16. A video encoder system comprising:

storage for storing a frame of a video;

at least one processor communicatively coupled to the storage; and an encoder module configured to:

downscale a block of the frame to generate a downscaled block;

process the downscaled block to generate compression efficacy data indicative of an efficacy of encoding the block using inter-frame prediction;

based on the compression efficacy data, determine that the block is to be encoded using inter-frame prediction;

encode the block using inter-frame prediction; and downscale a reference block of a reference frame of the video to generate a downscaled reference block, wherein:

the processing the downscaled block comprises:

generating, using intra-frame prediction, an intra-frame predicted downscaled block based on the downscaled block; and generating, using inter-frame prediction, an inter-frame predicted downscaled block based on the downscaled block and the downscaled reference block, and wherein:

the compression efficacy data is based on a comparison calculated using the intra-frame predicted downscaled block and the inter-frame predicted downscaled block, wherein;

the comparison is calculated by comparing:

a first difference between the intra-frame predicted downscaled block and the downscaled block; and a second difference between the inter-frame predicted downscaled block and the downscaled block, and wherein, the determining that the block is to be encoded using inter-frame prediction comprises determining that a ratio of the second difference to the first difference is equal to or smaller than a threshold ratio.

17. The video encoder system according to claim 16, wherein the encoder module comprises a motion estimation module configured to perform the downscaling, the processing and the determining.

18. The video encoder system according to claim 17, wherein the motion estimation module is further configured to:

process the downscaled block with the downscaled reference block to calculate motion data representative of an estimated motion between the downscaled block and the downscaled reference block.

19. The video encoder system according to claim 16, wherein:

the generating, using the intra-frame prediction, the intra-frame predicted downscaled block comprises calculating a value of the intra-frame predicted downscaled block based on a respective value of at least one other previously encoded and reconstructed downscaled pixel of the frame.

20. The video encoder system according to claim 16, wherein the generating the inter-frame predicted downscaled block comprises transforming the reference block using motion data representative of an estimated motion between the downscaled block and the reference block.

* * * * *